Jan. 2, 1968  H. K. NOWISCH  3,361,491

ROLL BEARING ASSEMBLY

Filed April 8, 1965

INVENTOR

HEINZ K. NOWISCH

BY *Jennie and Smiley*

ATTORNEYS 3,361,491
ROLL BEARING ASSEMBLY
Heinz K. Nowisch, Sandston, Va., assignor to The Inta-Roto Machine Company, Inc., Richmond, Va., a corporation of Virginia
Filed Apr. 8, 1965, Ser. No. 446,668
12 Claims. (Cl. 308—20)

ABSTRACT OF THE DISCLOSURE

A bearing assembly for tubular rolls formed of relatively soft metal such as aluminum, including a mounting ring fitted in each end of the roll and retained by a snap ring, in an annular groove within the roll, and a bearing supporting ring is retained within each roll end against a shoulder by fasteners connecting the respective mounting and bearing rings.

---

Figure 1:
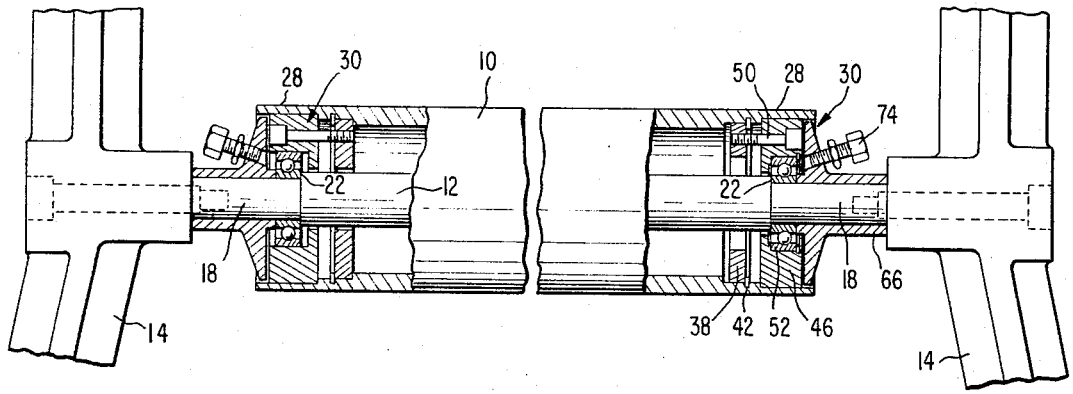

The present invention generally appertains to improvements in the mounting of rolls for use primarily in the handling of web or sheet material for various operations and, more specifically, relates to the mounting of web handling rolls which are formed from aluminum or similar relatively soft material.

Aluminum rolls are preferred in web handling machinery because they are inexpensive and are very light in weight. However, because of the inherent nature of the material, that is, the softness of the aluminum, considerable difficulties arise, both from a cost standpoint and an operational standpoint, in effectively mounting such rolls for rotary movement. The aluminum rolls must be mounted by means of steel bearings but, due to the softness of aluminum, such bearings cannot be press fitted in the usual manner because the bearings readily become loosely fitted. As a general rule, the bearings are rigidly secured to the rolls by radial screws, and such screws must be disposed outwardly beyond the web contacting surfaces of the rolls, thus increasing the overall length of the rolls.

Having in mind the defects of the prior art arrangements, it is the primary object of the present invention to overcome the difficulties encountered in the mounting of aluminum rolls by providing a novel bearing assembly which is particularly, though not restrictively, adapted for achieving an inexpensive, effective and durable mounting of rolls formed from aluminum or other relatively soft material.

Another important object of the present invention is to provide a bearing assembly for rotatably mounting an aluminum roll on a supporting shaft in such a way that the aluminum roll is in no way weakened or the bearings of the assembly are in no way subject to looseness.

A further important object of the present invention is to provide a roll bearing assembly which does not increase the length of the roll because the bearing assembly is formed and mounted in such a manner that the entire length of the roll can present an outer web contacting surface.

A still further important object of the present invention is to provide a roll bearing assembly which is extremely compact and is constructed from relatively few parts and assembled in such a way that it can be installed easily and quickly to rotatably mount a roll on a supporting shaft.

Figure 2:
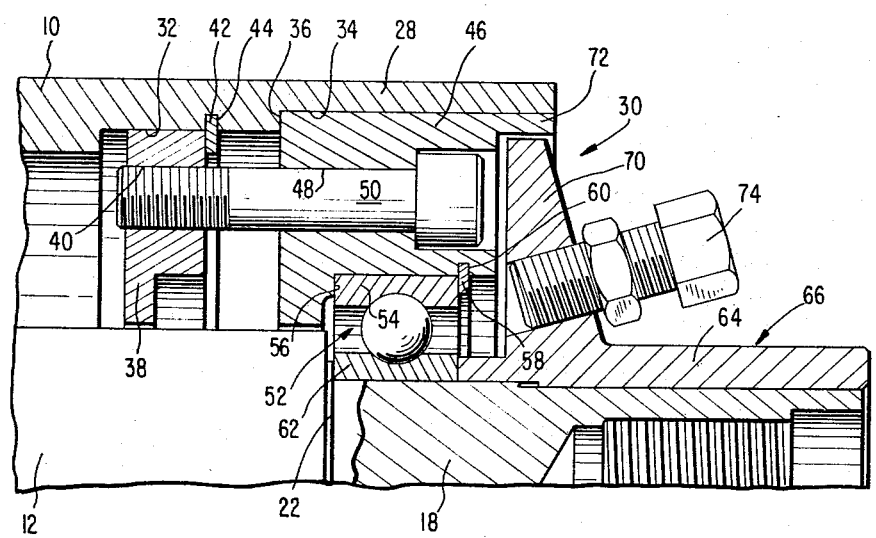

The novel features that are considered characteristic of the invention are set forth with particularity in the appended claims. The invention itself, however, both as to its organization and its method of operation, together with additional objects and advantages thereof, will best be understood from the following description of a specific embodiment when read in connection with the accompanying drawing, wherein like reference characters indicate like parts throughout the several figures and in which:

FIG. 1 is a side elevational view of a web handling roll which is rotatably mounted on a shaft by bearing assemblies shown in section, according to the present invention, and FIG. 2 is an enlraged, fragmentary, cross-sectional view of the bearing assembly.

Referring now more particularly to the accompanying drawing, and initially to FIG. 1, the roll 10, which is formed from aluminum or other relatively soft material, is rotatably journaled on a shaft 12 mounted on a frame 14. The shaft 12 has coaxially reduced end portions 18 which at their junctures with the main portion 20 of the shaft define annular external shoulders 22. The roll 10 is rotatably mounted on the shaft 12 at its open ends 28 by a bearing assembly 30, shown in greater and clearer detail in FIG. 2, which includes a double counterbore 32 and 34 formed in each end 28 of the roll 10 and creating an internal annular radial shoulder 36 between the inner and outer counterbores 32 and 34.

A steel mounting or anchor ring 38 is positioned within the inner counterbore 32 and is held in place, and prevented from moving outwardly of the respective roll end by a snap ring 42 which is fitted in an annular groove 44 formed in the inner counterbore 32. The ring 38 preferably bears against the inner surface of the counterbore, but it is spaced from the main portion of the shaft 12 which it surrounds. The mounting ring 38 is formed with a circumferentially spaced series of internally threaded holes 40 that are parallel with the axes of the roll and the shaft.

A bearing ring 46 is positioned in the outer counterbore 34 and is secured in place by fastening means which includes the mounting ring 38. The bearing ring 46 is formed with a series of circumferentially spaced bores 48 which are disposed for axial alignment with the holes 40 in the mounting ring 38. Screws 50 are passed through the bores 48 and have their threaded extremities screwed into the holes 40 to draw the bearing carrying ring 46 tightly against the shoulder 36 with the mounting ring 38 tightly against the snap ring 42. The heads of the screws 50 are seated in counterbores of the bores 48.

Antifriction bearings 52 are fitted in the supporting ring 46 with the outer race 54 engaging the inner wall of the ring 46 and abutting at its inner end against a radial shoulder 56 formed in the inner wall of the ring 46. A snap ring 58 is fitted in an annular groove 60 formed in the inner wall of the ring 46 and bears against the outer end of the race 54 to hold the race 54 in place. In the case of a relatively long roll, the snap ring 58 is omitted at one end to permit relative axial movement between the bearing ring 48 and outer race 54. The inner race 62 bears, at its inner end, against the shaft shoulder 22 and is circumposed on the inner end of the end portion 18 of the shaft.

The inner race is held against the shoulder 22 of the shaft by the inner end of an annular mounting portion 64 of a lubricant seal means 66 and which is mounted on the shaft end portion 18. The lubricant seal means 66 further includes a cover plate 70 having a lubricant fitting 74, and extends radially outwardly from the mounting portion 64 and encloses the bearings 52. The cover plate is spaced outwardly from the major end surface of the bearing supporting ring 46 and extends almost out to the inner wall of an extended sleeve 72 of the bearing carrying ring 46.

In mounting the bearing assembly 30, the mounting rings 38 are inserted into position within the inner counterbore 32 of the roll 10 and the snap ring 42 is inserted into the groove 44. The bearing ring 46, with the bearings 52, is inserted into the outer counterbore 34 and is secured tightly against the shoulder 36 by inserting the screws 50 through the bores 48 and threading them into the respective holes 40 to draw the rings 38 against the snap rings 42. The seal means 66 is then mounted on the shaft end portions and secured in any desired manner.

Thus, it can be seen that a bearing assembly is provided which will not have any effect on the soft aluminum roll 10 and which is compact and composed of relatively few, simple parts which can be assembled, quickly and easily, by an inexperienced worker. The bearing assembly is located between the shaft and the inner ends of the roll 10 so that the length of the roll is not determined by the bearing assembly and the entire outer surface of the roll is free for web contact.

Although a certain specific embodiment of the invention has been shown and described, it is obvious that many modifications thereof are possible. The invention, therefore, is not to be restricted except insofar as is necessitated by the prior art and by the spirit of the appended claims.

What is claimed is:

1. A roll bearing assembly, particularly for rolls formed of relatively soft metal such as aluminum, comprising a roll having a bore in at least one end and a groove within said bore, shoulder forming means within said bore and including a snap ring seated in said groove, a cylindrical mounting member freely slidably fitted with said bore inwardly of said snap ring and having a plurality of fastening means disposed parallel to the roll axis and spaced around said member, a bearing ring fitted in said bore outwardly of said shoulder forming means, a bearing fitted within said bearing ring for mounting on a shaft, said bearing ring having a plurality of bores corresponding to and axally aligned with said mounting member fastening means, and fasteners cooperating with said fastening means through said bearing ring bores and securing said mounting member against the inner side of said shoulder forming means and said bearing ring against the outer side of said shoulder forming means.

2. A roll bearing assembly according to claim 1 comprising second shoulder forming means within said bore inwardly of said snap ring and limiting inward movement of said mounting ring.

3. A roll bearing assembly according to claim 2 wherein said bore comprises a counterbore the inner end of which constitutes said second shoulder forming means.

4. An assembly according to claim 1 wherein said fastening means comprises internally threaded bores in said mounting ring and said fasteners comprise bolts extending through said bearing bores and threaded into said mounting ring bores for drawing said mounting ring against said snap ring and said bearing ring against said shoulder.

5. A roll bearing assembly, particularly for rolls formed of relatively soft metal such as aluminum, comprising a tubular roll having double counterbores, with a radial shoulder therebetween in at least one end, said roll having an annular groove within the inner of said counterbores, a mounting ring fitted in said inner counterbore and having a plurality of fastening means disposed parallel to the roll axis and spaced around said ring, a snap ring fitted in said groove and extending inwardly of said counterbore and constituting an abutment outwardly of said mounting ring, a bearing ring fitted in the outer counterbore, a bearing fitted within said bearing ring, said bearing ring having a plurality of bores corresponding to and axially aligned with said mounting ring fastening means, and fasteners cooperating with said fastening means through said bearing ring bores and secured to said mounting ring against the inner side of said snap ring and said bearing ring against said radial shoulder.

6. An assembly according to claim 5 wherein said fastening means comprises internally threaded bores in said mounting ring and said fasteners comprise bolts extending through said bearing bores and threaded into said mounting ring bores for drawing said mounting ring against said snap ring and said bearing ring against said shoulder.

7. A roll assembly comprising a shaft, a tubular roll formed of relatively soft metal such as aluminum and surrounding said shaft, said roll having a through bore and an annular groove within each end portion of said bore and spaced inwardly of each roll end, and a bearing assembly within said bore end portions and mounted on said shaft, each said assembly including shoulder forming means within said bore and including a snap ring seated in said groove, a cylindrical mounting member in said bore inwardly of said shoulder forming means and having a plurality of fastening means disposed parallel to the roll axis and spaced around said member, a bearing ring fitted in said bore outwardly of said shoulder forming means, a bearing fitted within said bearing ring and mounted on said shaft, said bearing ring having a plurality of bores corresponding to and axially aligned with said mounting member fastening means, and fasteners cooperating with said fastening means through said bearing ring bores and securing said mounting member against the inner side of said snap ring and said bearing ring against the outer side of said shoulder forming means.

8. A roll bearing assembly according to claim 7 comprising second shoulder forming means within said bore inwardly of said snap ring and limiting inward movement of said mounting ring.

9. A roll bearing assembly according to claim 8 wherein said bore comprises a counterbore the inner end of which constitutes said second shoulder forming means.

10. An assembly according to claim 7 wherein said fastening means comprises internally threaded bores in said mounting ring and said fasteners comprise bolts extending through said bearing bores and threaded into said mounting ring bores for drawing said mounting ring against said snap ring and said bearing ring against said shoulder.

11. A roll assembly comprising a shaft, a tubular roll formed of relatively soft metal and having double counterbores with a radial shoulder therebetween in each end thereof, a mounting ring freely fitted slidably in each inner counterbore and having a plurality of fastening means disposed parallel to the roll axis and spaced around said ring, said roll having a groove within each inner counterbore adjacent the outer end thereof, a snap ring fitted in each said groove and extending inwardly of the respective counterbore and constituting an abutment for the respective mounting ring, a bearing ring fitted in each outer counterbore, a bearing fitted within each bearing ring and surrounding said shaft to support said roll thereon, said bearing ring having a plurality of bores corresponding to and axially aligned with said mounting ring fastening means, and fasteners cooperating with said fastening means through said bearing ring bores and secured to the respective mounting ring fastening means to retain said mounting rings against said snap rings and said bearing rings against said radial shoulders.

12. An assembly according to claim 11 wherein said fastening means comprises internally threaded bores in said mounting rings and said fasteners comprise bolts extending through said bearing bores and threaded into the respective mounting ring bores for drawing said mounting ring against said snap ring and said bearing ring against said shoulder.

References Cited

UNITED STATES PATENTS

| | | | |
|---|---|---|---|
| 1,793,190 | 2/1931 | Philips | 308—20 |
| 2,468,339 | 4/1949 | Miller | 308—20 |
| 2,594,214 | 4/1952 | Ras. | |
| 2,717,814 | 9/1955 | Archer | 308—20 |
| 2,736,617 | 2/1956 | Lippmann | 308—20 |
| 3,198,318 | 8/1965 | Brown | 308—20 X |
| 3,251,199 | 5/1966 | Brady | 308—20 X |

FOREIGN PATENTS 312,618   5/1961   Great Britain.

OTHER REFERENCES

German printed application, 1,106,565, May 1961.

EDGAR W. GEOGHEGAN, *Primary Examiner.*

MARTIN P. SCHWADRON, *Examiner.*

R. F. HESS, *Assistant Examiner.*